United States Patent

[11] 3,583,154

| [72] | Inventor | Robert C. Utter<br>Indianapolis, Ind. |
|---|---|---|
| [21] | Appl. No. | 863,631 |
| [22] | Filed | Oct. 3, 1969 |
| [45] | Patented | June 8, 1971 |
| [73] | Assignee | General Motors Corporation<br>Detroit, Mich. |

[54] DUAL THROTTLE DRIVE RATIO CONTROL FOR A POWER TRANSMISSION
7 Claims, 1 Drawing Fig.

[52] U.S. Cl. ............................................. 60/19
[51] Int. Cl. ............................................. F02b 41/00
[50] Field of Search ............................... 60/19, 12, 11

[56] References Cited
UNITED STATES PATENTS
| 2,500,580 | 3/1950 | Segsworth | 60/19 |
| 2,516,662 | 7/1950 | Vickers et al. | 60/19 |
| 3,003,309 | 10/1961 | Bowers et al. | 60/19 |
| 3,274,768 | 9/1966 | Klein | 60/19 |

*Primary Examiner*—Edgar W. Geoghegan
*Attorneys*—W. E. Finken, A. M. Heiter and D. F. Scherer

ABSTRACT: A ratio control valve for use with a gas turbine driven hydrostatic transmission is shown and described in which the ratio control valve is acted upon by an engine governor control signal and a throttle control signal. An engine governor control provides a signal to the ratio control valve indicating engine speed and a throttle control signal indicating desired engine speed. The transmission drive ratio is established in accordance with these signals when the signals are balanced on the ratio control valve. The throttle control has two portions; a manual portion which controls a small range of throttle settings and a torque demand portion which is responsive to compressor discharge pressure of the gas turbine engine to control a larger range of throttle settings.

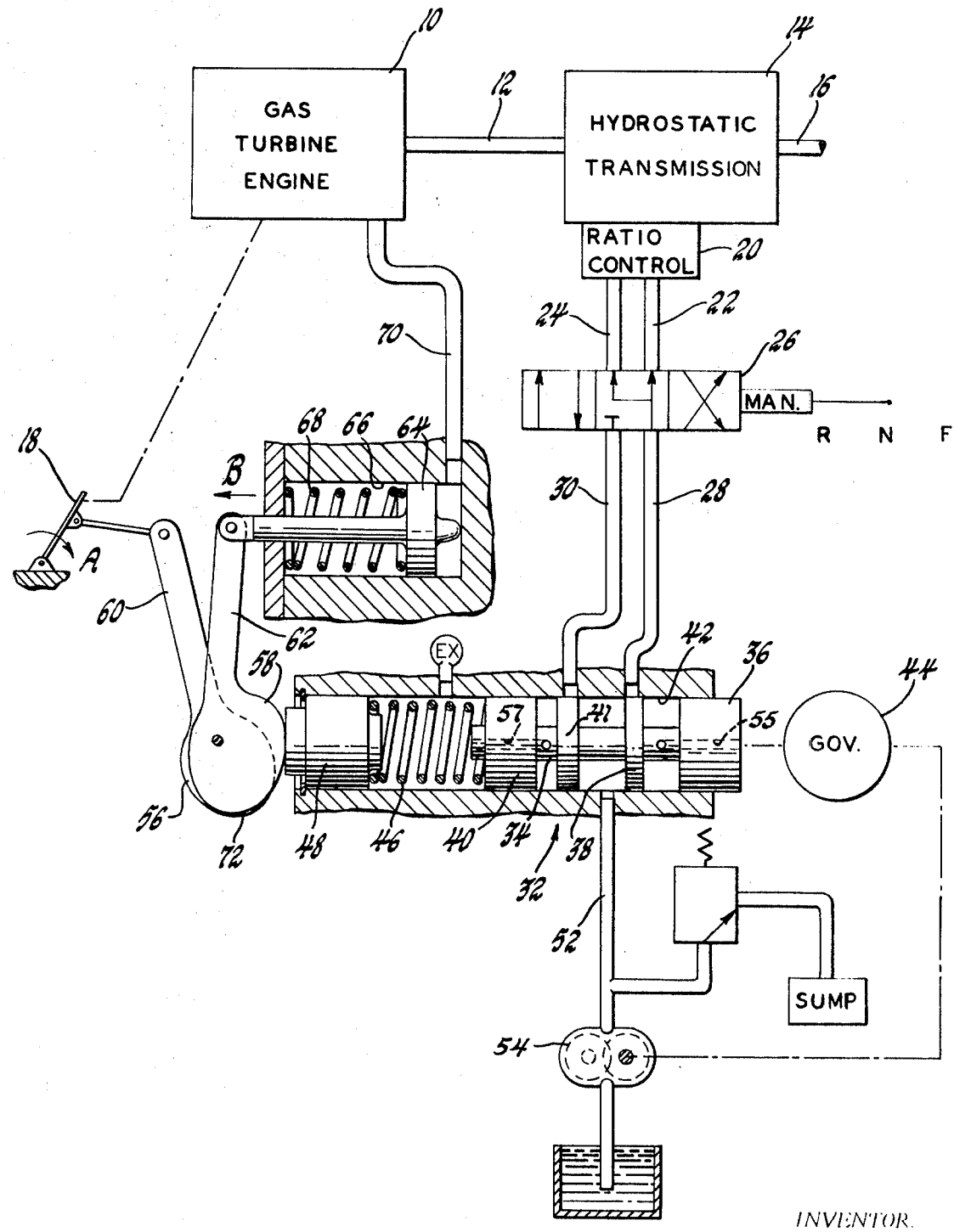

DUAL THROTTLE DRIVE RATIO CONTROL FOR A POWER TRANSMISSION

The invention herein described was made in the course of work under a contract or subcontract thereunder with the Department of the Army.

This invention relates to controls for hydraulic transmissions and more particularly to ratio controls for hydraulic transmissions driven by a gas turbine engine.

Hydrostatic transmissions provide an infinitely variable drive ratio from the driving engine to the driven load such as the drive wheels of a vehicle. This drive ratio is normally controlled by a ratio governor which senses engine speed and throttle position. Engine speed and throttle-setting signals are balanced against each other such that if governor or engine speed increases indicating engine overspeed for the instant throttle setting, the drive ratio will be increased or advanced from neutral, and if the throttle setting indicating engine underspeed for that throttle setting is increased, the drive ratio will be reduced to returned towards neutral. When the hydrostatic transmission is driven by an internal combustion engine, the engine speed will normally change quite rapidly with changes in throttle position to provide an ever increasing drive ratio while the engine is accelerated. However, when a gas turbine engine is the prime mover, the throttle advance can be quite rapid while the engine speed will lag. Therefore, the drive ratio will be maintained at a reduced or low value until the gas turbine begins to accelerate at which time the drive ratio will begin to increase rapidly. This rapid advance in drive ratio occurs when the engine is accelerating at a very high rate. Therefore, the transmission must accept the vehicle road load, vehicle inertia and the rotating inertia of the gas turbine engine. This loading can be quite severe and detrimental to both the engine and the transmission. Also, the passengers in the vehicle may undergo a rapid undesirable acceleration at this time. This condition can also occur with an internal combustion engine but it is more severe in a gas turbine engine.

The present invention eliminates this situation by providing an engine governor balanced by a throttle or torque demand signal which is proportional to compressor discharge pressure. This throttle signal does not advance rapidly with rapid increase in the operator throttle setting. The compressor discharge pressure develops in proportion to the engine power available. Thus, when the throttle is moved or advanced rapidly, the compressor discharge pressure and engine speed develop gradually so that the drive ratio in the transmission develops slowly and at a time when the engine has sufficient power to provide the drive required.

The engine idle speed of a gas turbine can vary through a wide range of values. If the idle speed is sufficiently high, it will create a governor signal which will request or induce a higher drive ratio than desired in the transmission, during initial engagement of the drive. This will result in rough engagement. The present invention uses a manual throttle control at a lower throttle setting which provides high throttle signals at or near idle to compensate for fluctuating or high governor speeds at idle. The manual throttle control insures that the drive ratio will be at zero, during idle and will permit slow or gradual increase in drive ratio as the throttle is advanced, by creating a throttle signal that is greater than the highest engine idle speed that can occur. This manual control is designed to operate over approximately 10 percent of throttle movement such that during this range of movement by the operator, the governor signals and throttle signals will become balanced to provide the correct drive ratio in the transmission. The manual control also permits the operator to control the drive ratio at low throttle settings thus providing an accurate low-speed control so that the operator can control vehicle speed when a creep condition is desired. The throttle signals above this 10 percent range are controlled by the compressor discharge pressure which provides a throttle signal proportional to engine torque demand or engine power availability.

It is therefore an object of this invention to provide the ratio governor for a hydrostatic transmission which will provide a manual throttle signal to oppose an engine governor signal at low throttle settings and a torque demand throttle signal proportional to compressor discharge pressure to oppose governor signals at higher throttle settings.

It is another object of this invention to provide an improved ratio control for a gas turbine hydraulic transmission in which engine governor signals indicate actual engine speed, the manual throttle control indicates the desired engine speed at low throttle settings and a torque demand throttle control indicates the desired engine speed at higher throttle settings so that the transmission drive ratio is set in accordance with these indicated engine speeds.

These and other objects and advantages of the invention will be apparent from the following description and drawing in which is shown a diagrammatic view of the ratio governor controlling a hydrostatic transmission.

Referring to the drawing, there is shown a gas turbine engine 10 having an output shaft 12 drivingly connected to an infinitely variable hydrostatic transmission 14 having an output shaft 16 adapted to drive a load such as a vehicle. The gas turbine engine 10 is controlled by a manual throttle control 18 which controls the fuel inlet to the gas turbine engine. The hydrostatic transmission 14 is controlled by a conventional servocontrol mechanism 20 such as that shown in application Ser. No. 843,097, filed June 17, 1969 by Robert C. Utter et al. The servocontrol 20 is in fluid communication through passages 22 and 24 with a direction control valve 26 which is in fluid communication with a return passage 28 and an advance passage 30 connected to a ratio control valve 32.

The direction control valve 26 is a conventional three positioned four-way valve which, in the neutral position, connects the three passages 28, 22 and 24 together and blocks passage 30; in the forward position, connects the passages 30 and 24 together and the passages 22 and 28 together; and in the reverse position, connects the passages 28 and 24 together and the passages 30 and 22 together. Thus, during forward operation, passage 24 will be a ratio advance line and passage 22 will be a ratio return line while during reverse operation, the passage 22 is a ratio advance line and the passage 24 is a ratio return line.

The ratio control valve 32, which may be termed a ratio governor in this particular application, includes a valve spool 34 having four equal diameter spaced lands 36, 38, 40 and 41 slidably disposed in a bore 42. The land 36 is operatively connected to an engine-driven governor 44 which may be of any conventional design such as a flyball-type governor. The valve land 40 abuts a compression spring 46 which is held compressed between the land 40 and a throttle plug valve 48. The lands 38 and 41 are aligned with the passages 28 and 30 respectively in the null position shown. The spring 46 imposes the force on the valve spool 34, urging it to the right against the governor 44. In the null position shown, the advance passage 30 is closed by land 41 while the return line 28 is closed by land 38. Also, in the position shown, the pressure inlet passage 52 is connected between lands 38 and 41 and is therefore closed to both the return and advance passages 28 and 30. The passage 52 is also connected to a conventional hydraulic pump 54 which supplies fluid pressure for the transmission control. The pump 54 is driven by the engine 10. The spaces between land 36 and 38 and land 40 and 41 are connected to exhaust via passages 55 and 57 respectively.

The throttle plug 48 is acted on by a manually operated manual cam 56 and a torque demand cam 58. The manual cam 56 is rotatable relative to the torque demand cam 58 and is controlled in its rotation by a lever 60 which is connected to the throttle control 18. The torque demand cam 58 is controlled in its rotation by a lever 62 which is operatively connected to a piston 64. The piston 64 is slidably disposed in a bore 66 and is urged to the right therein by a compression spring 68. The right end of bore 66 is connected to a passage 70 which is connected to the gas turbine engine 10. The passage 70 is connected to the compressor discharge of the gas turbine engine and thus provides the pressure to the piston 64 which is equal to the compressor discharge pressure.

Therefore, the cam 58 is controlled in its rotation by the compressor discharge of the gas turbine engine which is proportional to the torque demand or power availability of the engine.

In the drawing as shown, the manual throttle control 18 has been rotated clockwise in the direction of arrow A so that the surface 72 of the cam 56 has been rotated away from the plug 48 to permit the cam 58 to assume the function of positioning the throttle plug 48 and therefore the force in spring 46. The cam 58 will remain in this position until the compressor discharge pressure in passage 70 is sufficient to move the piston 64 in the direction of arrow B thereby rotating the cam 58. As the cam 58 rotates, the force in spring 46 will increase thereby moving the spool 34 to the right against the force of governor to provide a ratio decrease. Should the engine increase in speed indicating overspeed relative to throttle setting, the force of governor 44 will move the spool 34 to the left against spring 46 to cause a ratio increase. When the spool 34 is moved a sufficient amount against the spring 46, due to increased governor force, the return passage 28 will be exhausted between lands 36 and 38 and the advance passage 30 will be open between land 38 and 41 to the pressure in passage 52. Assuming the directional control valve 26 is in the forward position, this will permit pressure in passage 30 to enter passage 24 and thereby cause a forward advance or increase in the drive ratio of the hydrostatic transmission 14. As the transmission ratio increases, the load on the gas turbine engine 10 will increase. When the power of the gas turbine engine, which is proportional to the compressor discharge pressure in passage 70, and the governor force in governor 44 are balanced on the valve spool 34, the valve spool 34 will return to the null position shown such that the pressure passage 52 is open a small amount to both the return passage 28 and the advance passage 30 to maintain the hydrostatic transmission 14 at that ratio. If the compressor discharge pressure in passage 70 should increase, thereby indicating an increase in power and an engine underspeed condition relative to throttle setting, the valve spool 34 will move to the right to cause a decrease in drive ratio, unless the engine speed has increased to balance the force on spool 34, by connecting passage 52 to passage 28 between lands 38 and 41 while exhausting passage 30 between lands 40 and 41. If the pressure in passage 70 should decrease, thereby indicating a decrease in power available and an engine overspeed condition, the valve spool 34 will move to the left to open passage 52 to passage 30 to cause an increase in the drive ration unless the engine speed is decreased to balance the forces on valve spool 34.

Since the eccentricity of cam 56 is greater than the eccentricity of cam 58, the surface 72 of cam 56 will contact the throttle plug 48 at light throttle setting. This will permit the operator to mechanically control the throttle bias on the ratio governor 32 at the low throttle setting thereby permitting the operator to manually control the transmission drive ratio. It has been found that approximately 10 percent of throttle travel is a sufficient range over which manual control is desired. As the cam 56 is rotated clockwise, during the first 10 percent of movement, the force on spring 46 is reduced thereby indicating an overspeed condition. The drive ratio will increase in response to the overspeed condition to permit the operator to control inching of the vehicle.

In the preferred embodiment shown, the ratio control valve 32 is used with a gas turbine driven hydrostatic transmission to provide an infinitely variable ratio signal. However, the present invention can also be used with an internal combustion engine driven transmission by replacing the compressor discharge signal with a pressure signal proportioned to engine torque or power such as manifold pressure.

Since obvious modifications and variations will occur to those skilled in the art, the foregoing description and drawing is intended as an illustration of the preferred embodiment of the invention and not as a limitation thereof.

What I claim is:

1. In a control for a hydraulic transmission having an infinitely variable drive ratio and driven by a gas turbine engine; ratio governor means operatively connected with said transmission to control the drive ratio thereof; engine governor means operatively connected to said ratio governor means for providing a governor signal thereto; and throttle control means operatively connected to said ratio governor means and being movable through a throttle range including manual control means operative on said ratio governor means to provide a manual throttle signal thereto during an initial portion of the throttle range, and engine torque demand means operative on said ratio governor means to provide an engine torque demand signal thereto during the remaining portion of the throttle range.

2. In a control for a hydrostatic transmission having an infinitely variable drive ratio and driven by a gas turbine engine having a compressor discharge pressure; servocontrol means operatively connected with said transmission for controlling the drive ratio; ratio governor means in fluid communication with said servocontrol means for distributing a ratio advance signal and a ratio return signal thereto; engine governor means operatively connected with said ratio governor means for supplying a governor signal thereto proportional to the speed of the gas turbine engine; throttle control means movable through a throttle range and operatively connected with said ratio governor means for supplying a throttle signal thereto in opposition to the governor signal including manual throttle means for supplying a manual throttle signal during the initial portion of the throttle range and pressure throttle means operatively connected to the gas turbine engine to sense the compressor discharge pressure thereof for supplying a torque demand throttle signal during the throttle range after the initial portion.

3. In a control for a hydraulic transmission having an infinitely variable drive ratio and driven by a gas turbine engine; ratio governor means operatively connected with said transmission to control the drive ratio thereof; engine-driven governor means operatively connected to said ratio governor means for providing a governor signal thereto proportional to the speed of the gas turbine engine; and throttle control means operatively connected to said ratio governor means and being movable through a throttle range including manual control means operative on said ratio governor means to provide a manual throttle signal thereto during an initial portion of the throttle range in opposition to the governor signal, and engine torque demand means operative on said ratio governor means to provide an engine torque demand signal thereto during the remaining portion of the throttle range in opposition to the governor signal.

4. In a control for a hydraulic transmission having an infinitely variable drive ratio and driven by a gas turbine engine; ratio governor means operatively connected with said transmission to control the drive ratio thereof and including valve spool means; engine governor means operatively connected to said valve spool means for providing a governor signal thereto; and throttle control means operatively connected to said ratio governor means and being movable through a throttle range including manual control means having cam means contacting said valve spool means to provide a manual throttle signal thereto during an initial portion of the throttle range, and engine torque demand means including cam means, contacting said valve spool means to provide an engine torque demand signal thereto during the remaining portion of the throttle range when said first-mentioned cam means is out of contact with said valve spool means.

5. In a control for a hydrostatic transmission having an infinitely variable drive ratio and driven by a gas turbine engine having a compressor discharge pressure; servocontrol means operatively connected with said transmission for controlling the drive ratio; ratio governor means in fluid communication with said servocontrol means including valve spool means movable to distribute a ratio advance signal and a ratio return signal thereto; engine governor means operatively connected with said valve spool means for supplying a governor signal thereto proportional to the speed of the gas turbine engine to urge said valve spool means to distribute the ratio advance signal; throttle control means movable through a throttle range and operatively connected with said ratio governor means for supplying a throttle signal thereto in opposition to the governor signal including manual throttle means having cam means contacting said valve spool means during the initial portion of the throttle range for supplying a manual throttle signal greater than the governor signal at engine idle speed to prevent distribution of ratio advance signal and pressure throttle means operatively connected to the gas turbine engine to sense the compressor discharge pressure thereof including cam means rotatable in response to the compressor discharge pressure for supplying a torque demand throttle signal during the throttle range after the initial portion.

6. In a control for a multiratio transmission driven by a gas turbine engine having a compressor discharge pressure; ratio control means operatively connected with said transmission for controlling the drive ratio thereof; governor means operatively connected to said ratio control means for providing a governor signal thereto; and throttle control means operatively connected to said ratio control means to provide a manual throttle signal thereto during one portion of the throttle range, and engine torque demand means operative on said ratio governor means to provide an engine torque demand signal thereto in response to the compressor discharge pressure during the remaining portion of the throttle range.

7. In a control for a power transmission having drive ratio changing means and driven by a gas turbine engine having a compressor discharge pressure; ratio control means operatively connected with said transmission to control the drive ratio thereof; governor means operatively connected to said ratio control means for providing a ratio increase signal thereto; and throttle control means operatively connnected to said ratio control means and being movable through a throttle range to provide ratio decrease signals including manual control means operative on said ratio control means to provide a manual ratio decrease signal thereto during an end portion of the throttle range, and compressor discharge pressure means operative on said ratio control means to provide a compressor discharge pressure ratio decrease signal thereto during the remaining portion of the throttle range.

PO-1050
(5/69)

UNITED STATES PATENT OFFICE
CERTIFICATE OF CORRECTION

Patent No. 3,583,154          Dated June 8, 1971

Inventor(s) Robert C. Utter

It is certified that error appears in the above-identified patent and that said Letters Patent are hereby corrected as shown below:

Column 1, line 19, after reduced, delete "to" and insert -- or -- ;

Column 2, line 24, delete Ser. No. "843,097" and insert -- 834,097 -- ;

line 39, after passage 22, delete the second "is" ;

line 64, delete "manual" first occurrence;

line 64, delete "manual" second occurrence and insert -- manually operated -- ;

Column 3, line 48, delete "ration" and insert -- ratio -- .

Signed and sealed this 16th day of November 1971.

(SEAL)
Attest:

EDWARD M. FLETCHER, JR.          ROBERT GOTTSCHALK
Attesting Officer                   Acting Commissioner of Patents